(12) United States Patent
Rastetter

(10) Patent No.: US 6,286,882 B1
(45) Date of Patent: Sep. 11, 2001

(54) MOTOR VEHICLE WITH A PARTITION SEPARATING THE REAR SEAT AREA FROM THE FRONT SEAT AREA

(75) Inventor: Ina Rastetter, Althengstett (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/277,999

(22) Filed: Mar. 29, 1999

(30) Foreign Application Priority Data

Mar. 27, 1998 (DE) ............................................... 198 13 670

(51) Int. Cl.[7] ........................................................ B60P 3/05
(52) U.S. Cl. ................... 296/24.1; 296/DIG. 1; 49/370
(58) Field of Search ............................ 296/24.1, DIG. 1; 49/370, 366, 372

(56) References Cited

U.S. PATENT DOCUMENTS

| 133,359 | * | 11/1872 | Darley | 49/370 |
|---|---|---|---|---|
| 2,884,279 | * | 4/1959 | Halstead et al. | 296/24.1 |
| 3,015,515 | * | 1/1962 | Halstead et al. | 296/24.1 |
| 3,397,005 | * | 8/1968 | May et al. | 296/24.1 |
| 3,547,217 | * | 12/1970 | Garza | 296/24.1 |
| 4,015,875 | * | 4/1977 | Setina | 296/24.1 |
| 4,063,389 | * | 12/1977 | Leder | 49/370 |
| 4,173,369 | * | 11/1979 | Roggin | 296/24.1 |
| 4,432,213 | * | 2/1984 | Katahira et al. | 296/24.1 |
| 4,468,051 | * | 8/1984 | Kobayashi | 296/24.1 |
| 4,509,788 | * | 4/1985 | Jan et al. | 296/24.1 |
| 5,069,497 | | 12/1991 | Clelland . | |
| 5,511,842 | * | 4/1996 | Dillion | 296/24.1 |
| 5,536,057 | * | 7/1996 | Stewart | 296/24.1 |
| 5,632,520 | * | 5/1997 | Butz | 296/24.1 |
| 5,833,301 | * | 11/1998 | Watanabe et al. | 296/155 |
| 5,836,639 | * | 11/1998 | Kleefeldt et al. | 296/155 |
| 5,890,329 | * | 4/1999 | Krueger | 296/24.1 |
| 5,921,612 | * | 7/1999 | Mizuki et al. | 296/155 |

FOREIGN PATENT DOCUMENTS

| 1780367 | 1/1972 | (DE) . |
|---|---|---|
| 4428298C2 | 10/1996 | (DE) . |
| 849446 | 9/1960 | (GB) . |
| 1 588 892 | 4/1981 | (GB) . |

* cited by examiner

Primary Examiner—Joseph D. Pape
Assistant Examiner—Kiran Patel
(74) Attorney, Agent, or Firm—Crowell & Moring, L.L.P.

(57) ABSTRACT

A motor vehicle has a vehicle interior and a partition which divides the vehicle interior into a front area that has a driver's side, and a passenger side and a rear area. The partition is divided into at least two partial units that abut one another in a transverse direction of the vehicle. One partial unit of the partition is immovably mounted behind a driver's side of the front area. At least one additional partial unit is movable between two end positions, with the end positions opening or closing a passageway area between the front area and the rear area.

22 Claims, 8 Drawing Sheets

US 6,286,882 B1

MOTOR VEHICLE WITH A PARTITION SEPARATING THE REAR SEAT AREA FROM THE FRONT SEAT AREA

BACKGROUND AND SUMMARY OF THE INVENTION

This application claims the priority of German application 198 13 670.6, filed in Germany on Mar. 27, 1998, the disclosure of which is expressly incorporated by reference herein.

The invention relates to a motor vehicle with a vehicle interior as well as a partition that divides the vehicle interior into a front area having a driver's side and a passenger side, and a rear area.

A partition of this kind is known for example from German Patent Document No. DE 44 28 298 C2. The partition comprises a rigid immovable lower base part and a transparent upper part, and divides the vehicle interior over the entire width of the vehicle into a front seat area and a rear seat area.

A similar partition that serves to protect a driver and is attached to the rear of the seat back of the front seat bench is disclosed in German Patent Document No. DE 17 80 367. Up to the level of the seat back, this partition consists of a steel plate, with two sheets of armored glass above it. The two sheets of armored glass are mounted in a frame, with one sheet displaceable relative to the other.

A goal of the invention is to provide a motor vehicle of the species recited at the outset that has a partition whose variability is improved relative to the prior art.

This goal is achieved by virtue of the fact that the partition is divided into at least two partial units that abut one another in the transverse direction of the vehicle, with one partial unit of the partition being mounted immovably behind a driver's side in the front area and with at least one additional partial unit being movable between two end positions, with the end positions opening or closing a passageway area between the front area and the rear area.

As a result, the interior of the motor vehicle can be divided flexibly so that optionally a complete or partial separation of the driver plus passenger side, which forms the front area in the motor vehicle, from the rear area is possible. If the passenger seat is designed so that it can be brought into a facing position relative to the rear seat area, complete incorporation of the passenger side area into the rear area is possible by opening the partition. This creates a passageway from the rear area to the front area and vice versa.

In certain preferred embodiments of the invention, the (at least one) additional partial unit of the partition is mounted and guided to be linearly movable in the transverse direction of the vehicle. As a result, especially simple movability of the additional partial unit is created.

In certain preferred embodiments of the invention, the drive for the movable partial unit of the partition has associated with it a flexible pulling and pushing structure connected by a dimensionally stable deflecting guide with the partial unit to be moved. In this manner, an especially compact drive unit is created for the movable partial unit of the partition, since the drive does not have to be located laterally next to the movable partial unit, but can instead be located at the same level.

Other objects, advantages and novel features of the present invention will become apparent from the following detailed description of the invention when considered in conjunction with the accompanying drawings.

DETAILED DESCRIPTION OF THE DRAWINGS

Figure 1:
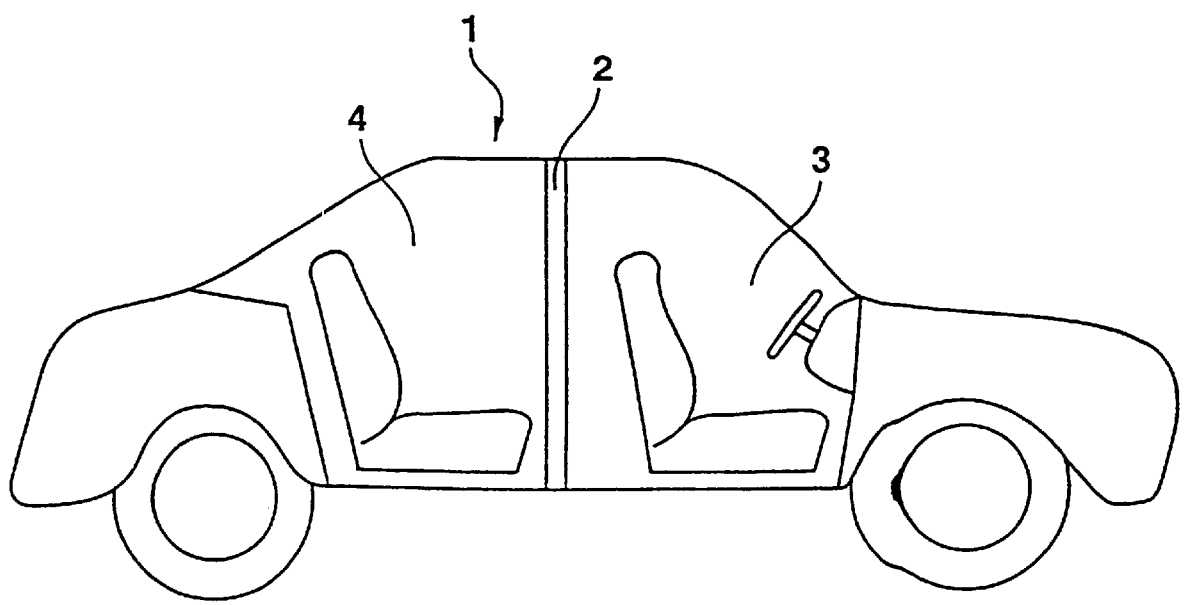
FIG. 1 shows schematically an embodiment of a motor vehicle according to the invention with the vehicle interior exposed, with a front area of the vehicle interior being separated from a rear area by a partition.

According to FIG. 1, a motor vehicle in the form of a four-door automobile 1 has a partition 2 described in greater detail below with reference to the various embodiments, said partition extending in the transverse direction of the vehicle over the entire width and height of a passenger compartment and dividing the vehicle interior into a front area 3 and a rear area 4. The front area 3 is provided with a driver side and a passenger side. A partition 2 of this kind will be described below in greater detail with reference to various embodiments.

Figure 2:
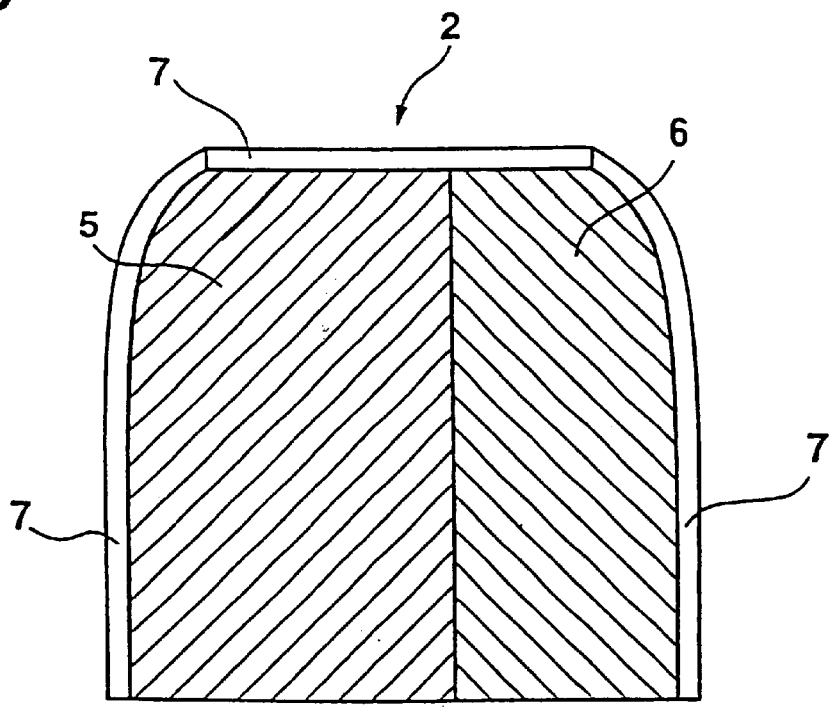
FIGS. 2 and 3 show schematically a front view of a partition for a vehicle interior similar to FIG. 1, with the partition show in its closed position in FIG. 2 and in its open position in FIG. 3.
Figure 3:
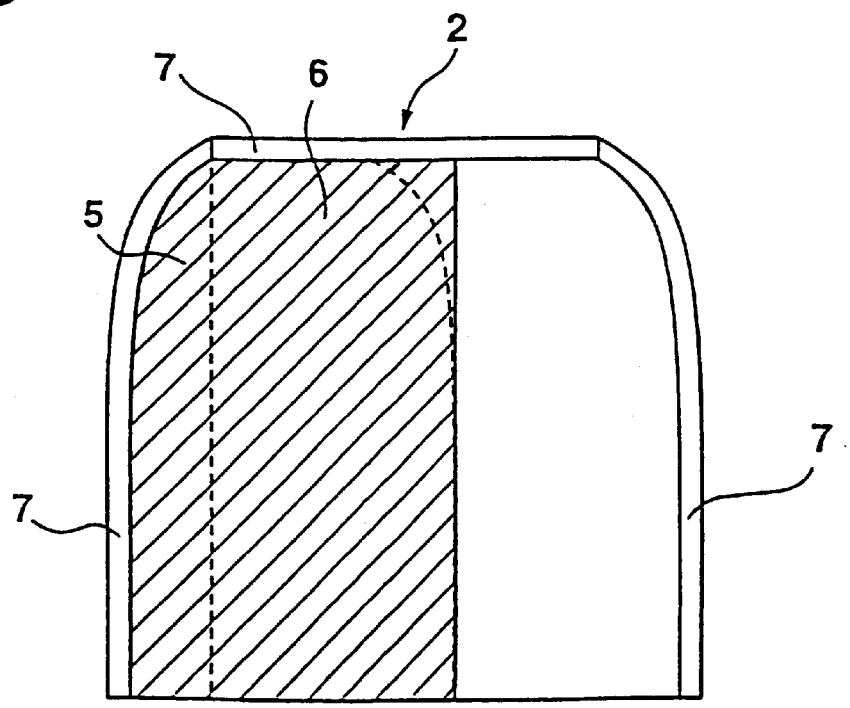

The partition according to FIGS. 2 and 3, behind a driver's side of front area 3, has a fixed and therefore immovable partial unit 5 fastened in the interior of the vehicle, said unit extending over the entire height of the vehicle interior as a one-piece plate-shaped part. Partial unit 5 can be made transparent or opaque. Partial unit 5 extends for slightly more than half the height of the width of the vehicle interior, as viewed from the driver's side. The remaining space at the level of the passenger side is closable by an additional partial unit 6 which however is mounted to be displaceable horizontally between the end positions shown in FIGS. 2 and 3. For this purpose, the movable partial unit 6 is mounted in corresponding linear guides both in the area of a floor of the motor vehicle and in a roof area. The movable partial unit 6 can be displaced by a drive unit or manually. The surrounding outer edge of each of partial units 5, 6 is framed by sealing profiles 7 that flank the corresponding outer edges of partial units 5, 6 both facing the front area and facing the rear area. These sealing profiles 7 produce a sound-proof seal between the front area and the rear area.

Figure 3A:
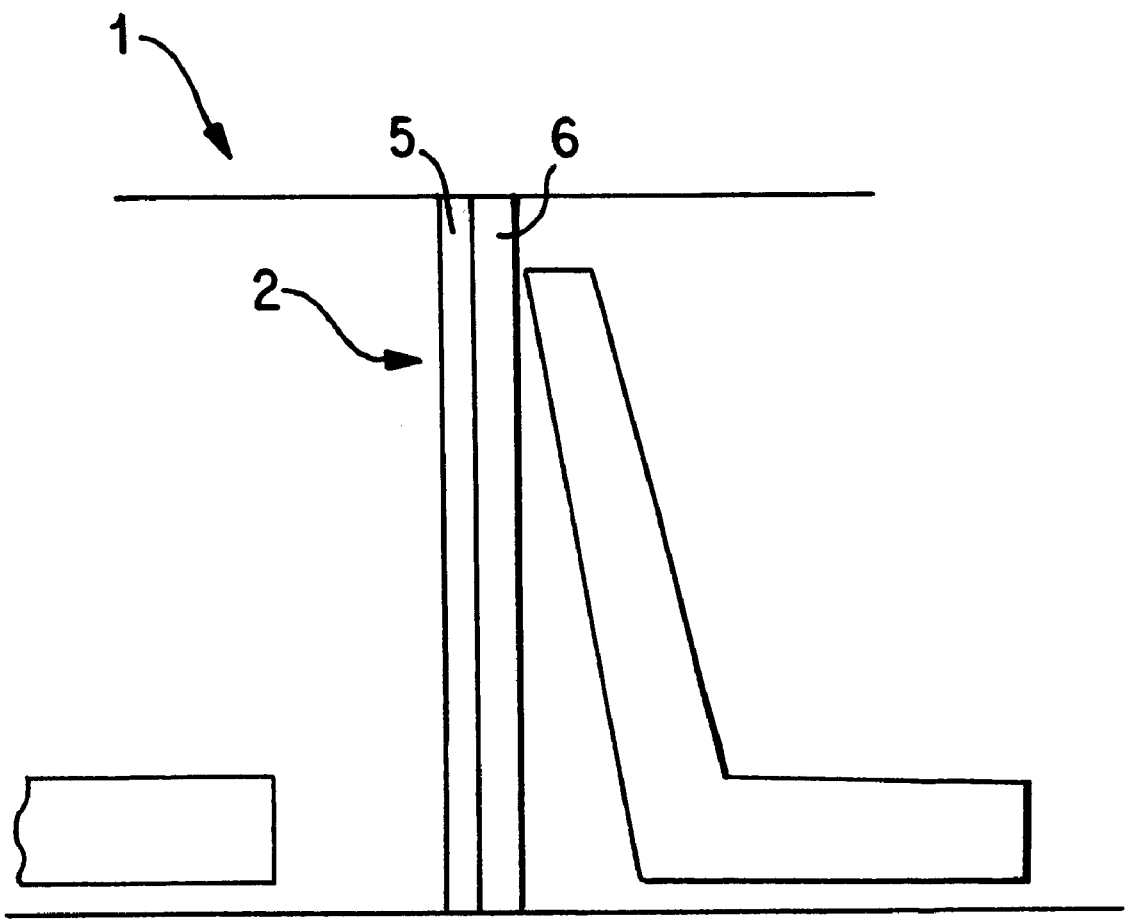
FIG. 3A shows schematically a side view of an alternate embodiment of the partition showing that the two partial units abut one another in a transverse direction of the vehicle.

FIG. 3A shows schematically a side view of an alternate embodiment of the partition 2 showing that the two partial units 5, 6 are arranged to abut one another in a transverse direction of the vehicle.

Figure 4:
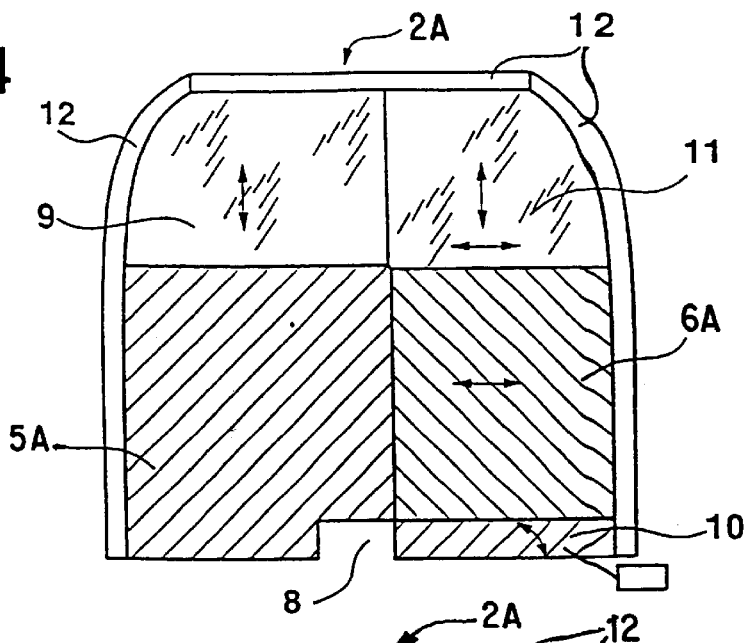
FIGS. 4 to 6 show schematically, in various open positions, an additional partition for an embodiment of the motor vehicle similar to FIG. 1.
Figure 5:
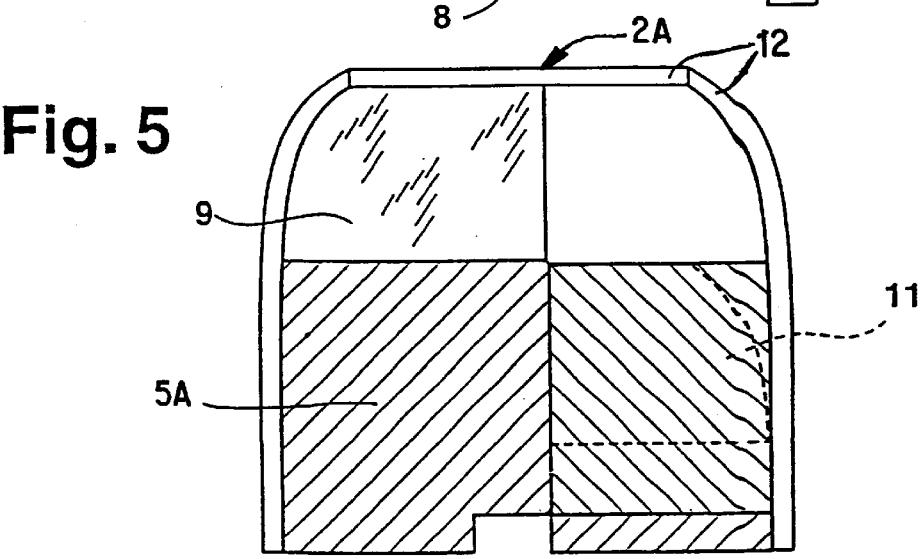
Figure 6:
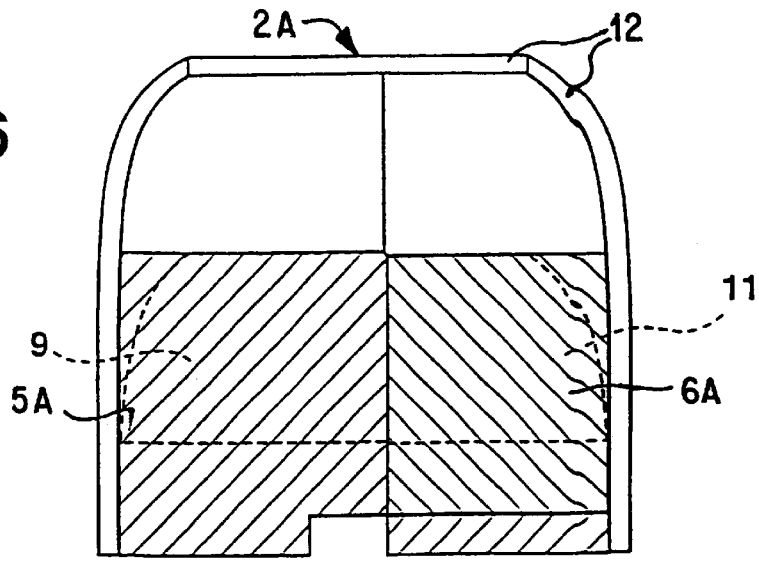
Figure 7:
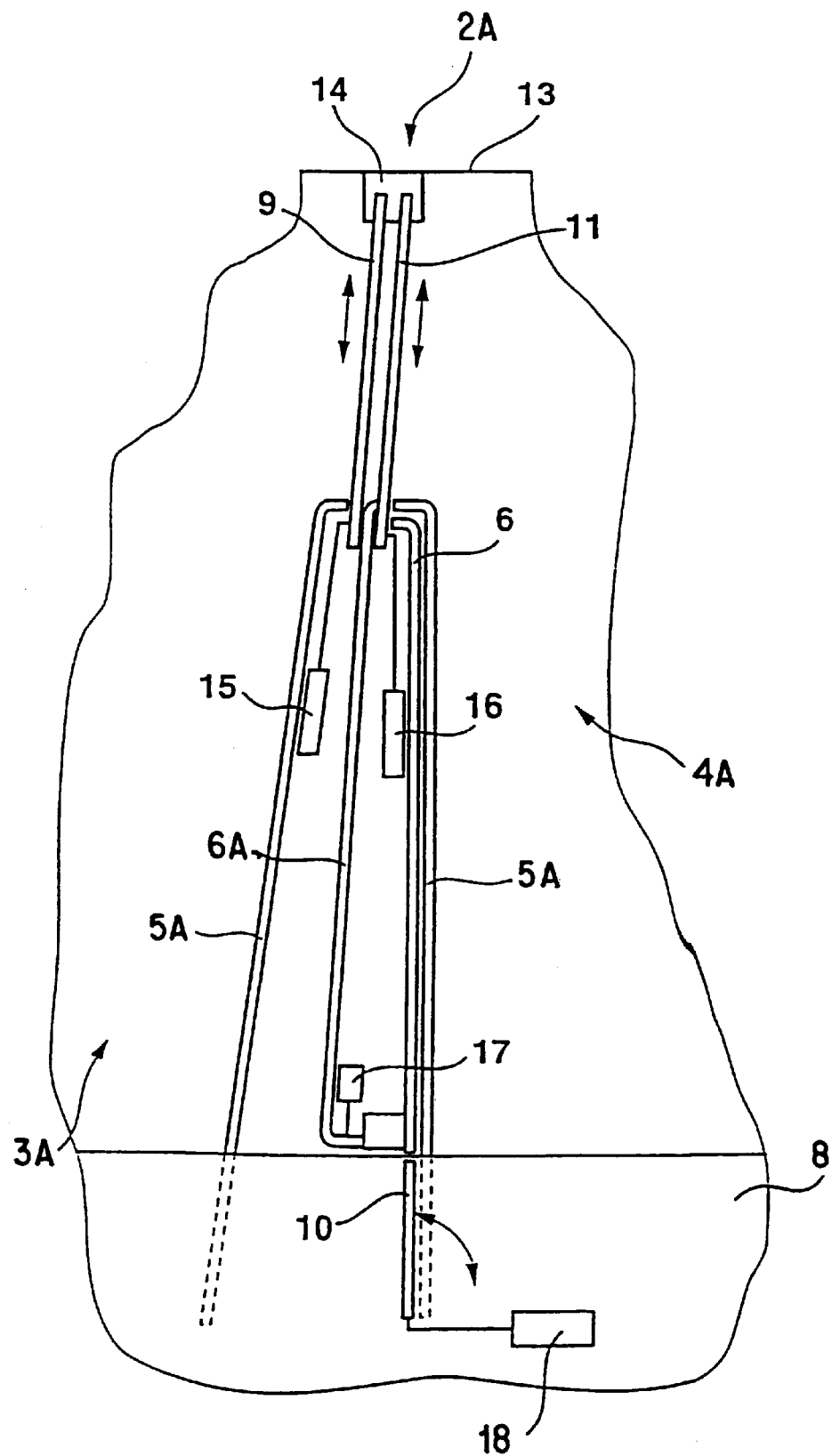
FIG. 7 shows in an enlarged sectional view, the partition according to FIGS. 4 to 6.

In the embodiment according to FIGS. 4 to 10, there is an important difference between the partition 2 shown therein and the partition according to FIGS. 2 and 3, consisting in the fact that each of the two partial units 5A, 6A is divided into two wall sections, with one upper wall section 9, 11 of each being designed as a transparent window pane 9, 11. In the partition according to FIGS. 4 to 6 as well, the partial unit 5A, 9 located behind a driver's side is designed to be fixed. The automobile in which partition 2 according to FIGS. 4 to 6 is located has a center tunnel 8 that extends in the lengthwise direction of the vehicle through the interior of the vehicle, said tunnel merely being indicated in FIGS. 4 to 6 and 7. The lower wall section of the fixed partial unit 5 is cut out in the vicinity of center tunnel 8, with the parting line running between fixed partial unit 5A, 9 and movable partial unit 6A, 11 approximately at the end of center tunnel 8 on the passenger side and approximately vertically upward.

The movable partial unit 6A, 11, 10, as in the case of the embodiment described earlier with reference to FIGS. 2 and 3, is mounted to be movable in the transverse direction of the vehicle. The horizontal double arrows in FIG. 4 indicate this mobility. The window pane 11 and lower wall section 6A of movable partial unit 6A, 11, 10 are displaced jointly to the left. In order to bridge center tunnel 8, the lower wall section 6A, 10 is additionally provided in its floor area with a foldable wall part 10 that is articulated with the floor and can be folded forward or backward in the lengthwise direction of the vehicle. The lower wall section 6A of movable partial unit 6A, 11 is displaceably mounted on the upper end edge of foldable wall part 10, as is particularly evident from FIGS. 9 and 10.

The two upper wall sections designed as window panes 9, 11 of both partial units 5A, 6A are mounted to be movable individually or jointly, vertically between a closed end position (FIGS. 4, 5) and an open end position (FIGS. 5, 6). The mobility is indicated by the vertical double arrows in FIG. 4. The special design of partition 2A according to FIGS. 4 to 6 is explained in great detail with reference to FIGS. 7 to 10. The fixed partial unit 5A is formed together with its lower wall section by two cover panels that abut the vehicle floor and the inside walls of the vehicle interior, and form between them a cavity to receive the drive units as well as guides for window panes 9, 11 and to receive movable partial unit 6A. Movable partial unit 6A is also formed by two cover panels which likewise have a cavity to receive guides for window pane 11 to receive a window lifter drive 16, and possibly additional functional units. The cover panels of the movable lower wall sections of partial unit 6A end directly above an upper edge of center tunnel 8. In the vicinity of the lower edge of the cover panels of movable partial unit 6A, a plurality of guide rollers 19 is provided, of which only one is shown schematically in FIG. 9. By means of this guide roller 19, the movable partial unit 6A is mounted on bearings by means of its cover panels on an upper end edge profile of the foldably movable wall part 10 so that movable partial unit 6A is displaceably mounted in the transverse direction of the vehicle.

Figure 8:
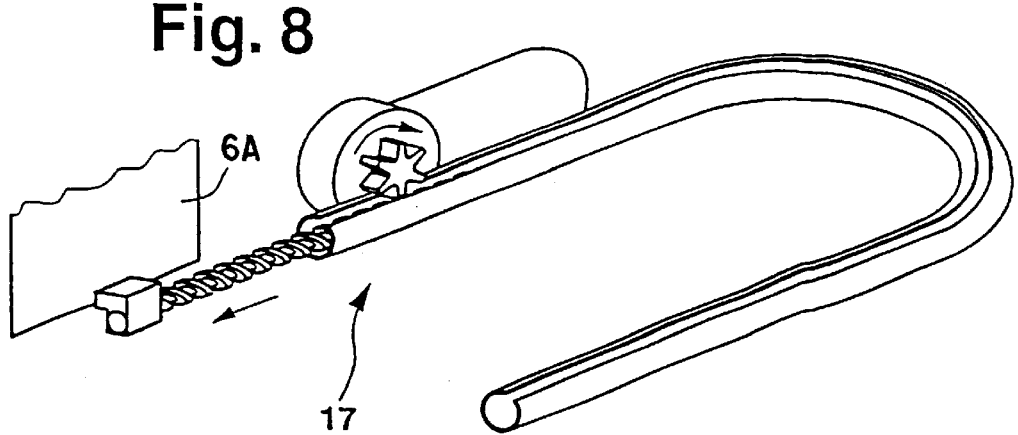
FIG. 8 shows in an enlarged view a detail of a horizontal drive for a movable partial unit of the partition according to FIG. 7.
Figure 9:
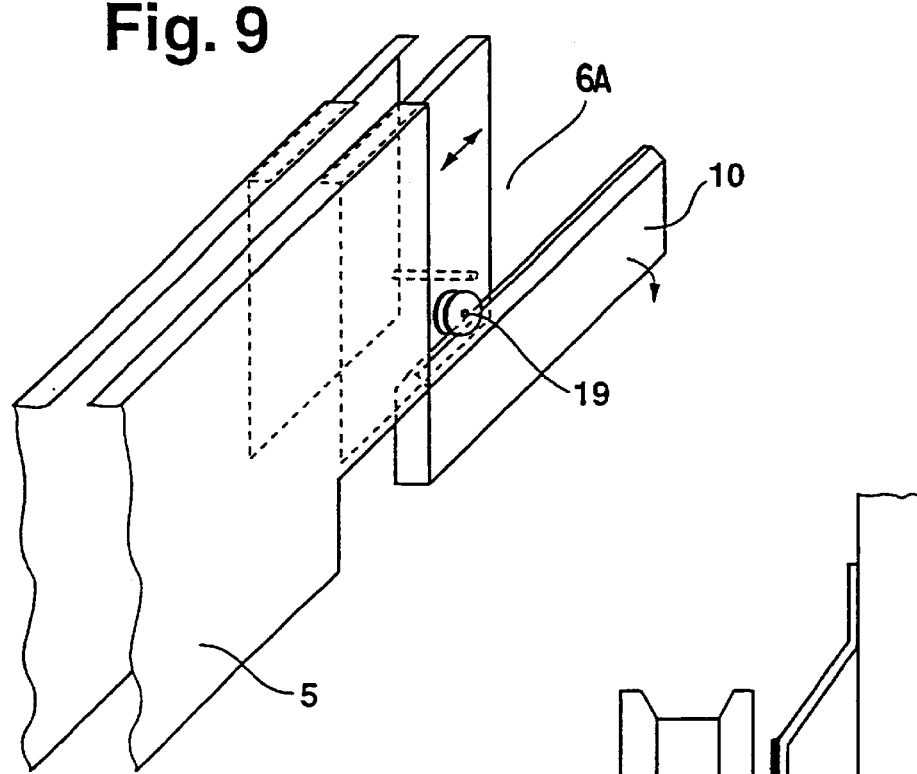
FIG. 9 shows in a perspective view a portion of the partition according to FIG. 7.
Figure 10:
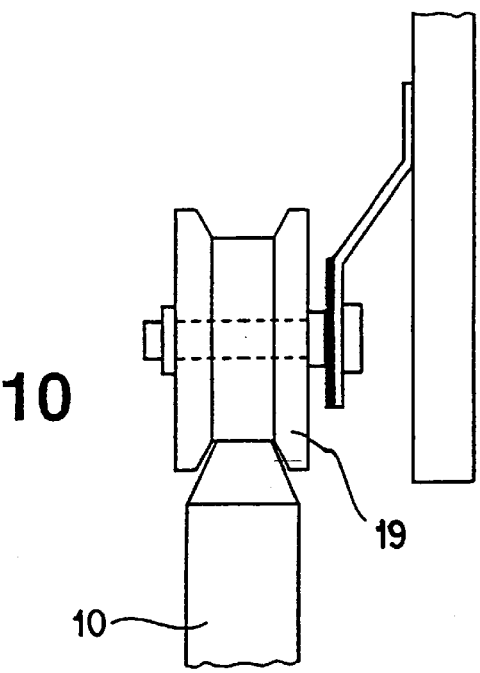
FIG. 10 shows in an enlarged view the mounting of a movable cover panel of a movable partial unit on an upper end edge of a pivotably movable flap of the movable partial unit.

For a pivoting movement of wall part 10, a pivoting drive 18 is provided that can perform a pivoting movement only if movable partial unit 6A is completely received in fixed partial unit 5A and thus is remote from wall part 10. The window lifter drives 15, 16 for window panes 9, 11 are designed as tubular window lifters. Associated power supply lines, especially for the movable partial unit 6A, can be guided in telescoping tubes. A horizontal drive 17 for transverse displacement of the movable partial unit 6A is designed to be especially compact, as shown in FIG. 8. For this purpose, a flexible pulling and pushing means in the form of a threaded screw made of plastic is guided in a dimensionally stable U-shaped curve guide rail. An adjusting drive is associated with the threaded screw by a corresponding pinion or a threaded nut. A compact arrangement for the drive is achieved by the guidance.

Depending on the design of the power supply and signal leads, different contacts can be provided at different points in the form of sliding or plug contacts or also in the form of zero-contact contacts.

Thus, a right-hand part of the partition (viewed in the direction of travel) can be completely removed by partition 2A according to FIGS. 4 to 10 so that a passageway results between the passenger area and the portion of the rear area behind it. In addition, window pane 9 of fixed partial unit 5A can be lowered into the lower wall section so that only the lower wall section of partial unit 6A remains as a fixed part. In addition, the partition 2A according to FIGS. 4 to 7 is sealed by sealing profiles 12, 14 in the vicinity of its circumferential outside contour, with the sealing profiles 12, 14 additionally serving to guide window panes 9, 11 or the movable cover panels shortly before they reach their respective closed end positions. Both in a roof area 13 of the vehicle interior and in the vicinity of the side walls, a sound-proof seal is thus produced by partition 2A as soon as the latter is closed completely.

Figure 11:
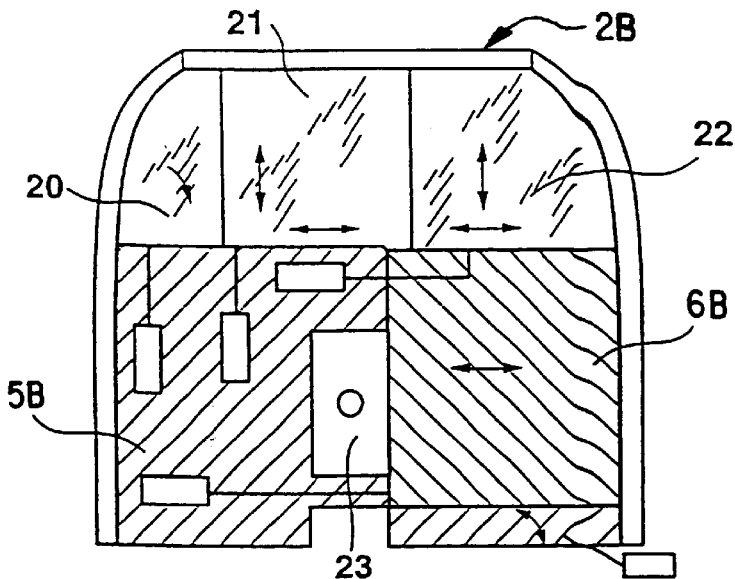
FIGS. 11 to 13 show, in three different open positions, another partition for an embodiment of the invention for a motor vehicle similar to FIG. 1.
Figure 12:
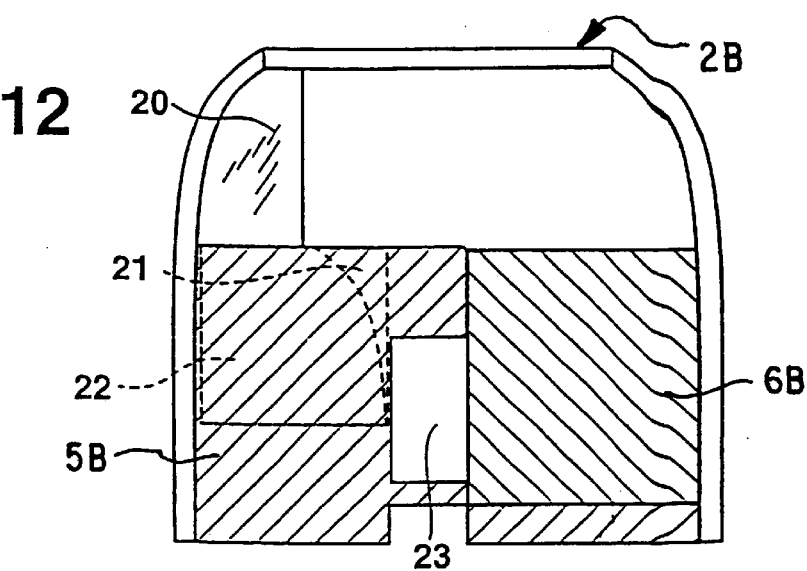
Figure 13:
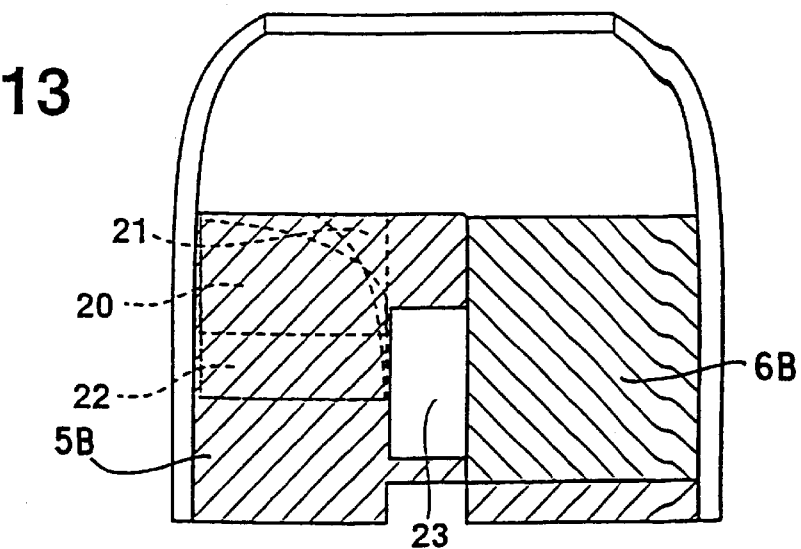

The partition according to FIGS. 11 to 13 is made slightly more elaborate by comparison with the partition according to FIGS. 4 to 10, so that only the differences from the partition according to FIGS. 4 to 10 will be discussed in greater detail below. In addition, the explanations for the previously described embodiments of the partitions can be used for the partition according to FIGS. 11 to 13 as well with corresponding reference numbers and a suffix "B" designating similar features. The partition according to FIGS. 11 to 13, for one thing, has three window panes 20 to 22 separate from one another as upper wall sections, which can be transferred to their open or closed end positions in accordance with the following description. All of the drives installed in various wall sections of the partition according to FIG. 11 are at the level of the lower wall section of the fixed partial unit 5B, with the latter preferably being located, between corresponding cover panels similarly to FIG. 7. The various arrow directions illustrate the possible movement of window panes 2B to 22 as well as the movable partial unit 6B. In addition, in the lower wall section of fixed partial unit 5B, a flap 23 is also provided for a receptacle that is mounted in a linearly movable fashion by means of an adjusting drive in the lengthwise direction of the vehicle, said receptacle being integrated in its resting position in a center console provided in the front area. This receptacle can serve to hold beverages, cigars, or other comfort items. Depending on the requirement, flap 23 can be folded away toward the rear area, so that the receptacle can be moved out into the rear area.

Especially preferably, two of the three window panes 20 to 22 are fastened jointly on a telescoping rod and are displaceable in the transverse direction of the vehicle by a suitable drive unit. By means of an additional drive unit, the two window panes 21, 22 are also movable vertically when they are in a lowered resting position according to FIGS. 12 and 13. Window pane 20 is also pivotably movable by means of an independent drive between a lowered resting position (FIG. 13) and a closed functional position (FIGS. 11 and 12) regardless of the other two window panes 21, 22.

Figure 14:
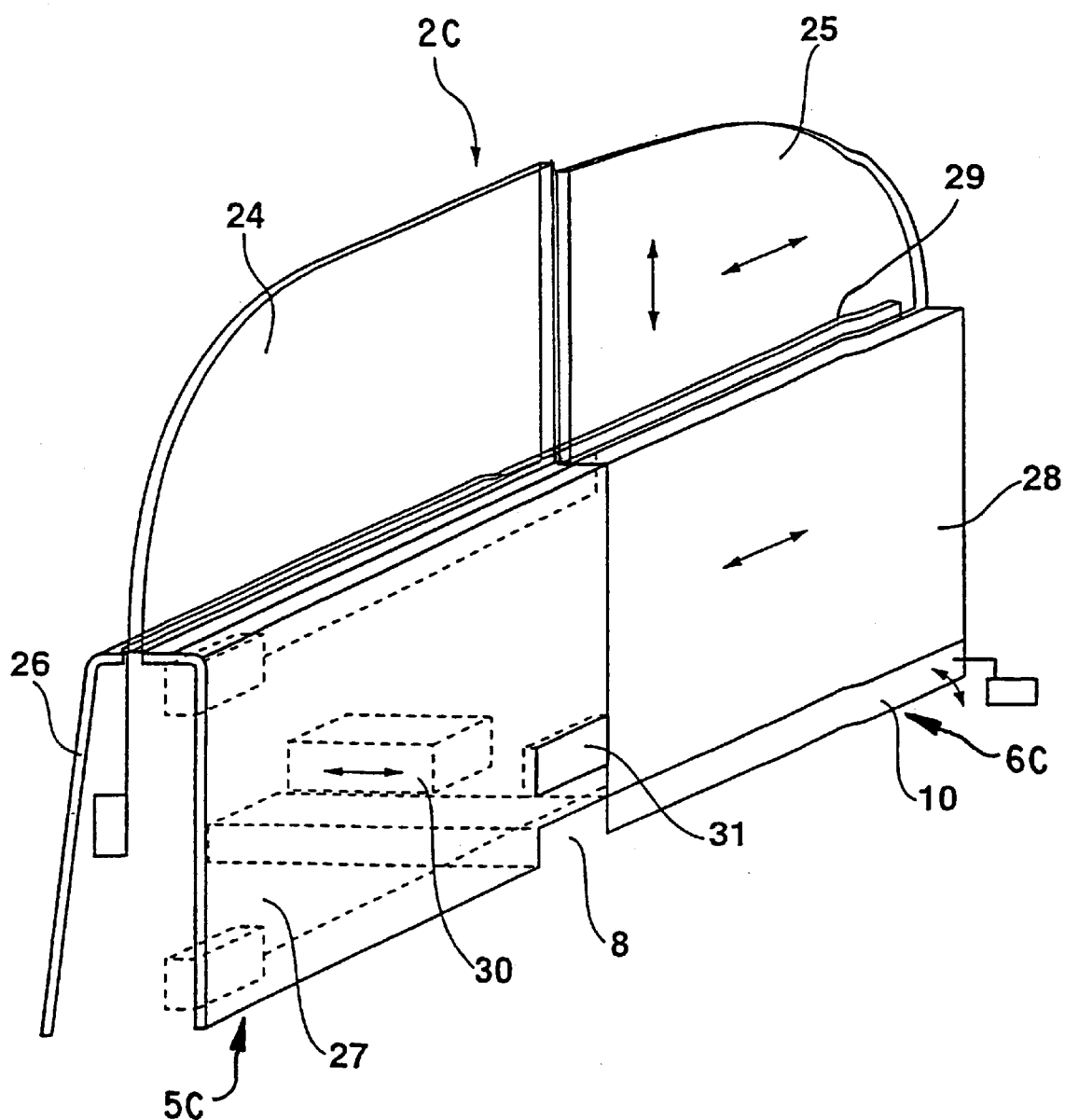
FIG. 14 shows in a perspective view another partition for another embodiment according to the invention for a motor vehicle similar to FIG. 1.

In the FIG. 14 illustration, similar reference numbers with a suffix "C" are used for similar features of the other embodiments. Unless otherwise indicated herein, the description of these features in the other embodiments also apply.

In the embodiment according to FIG. 14, all the drive units for the movable wall sections of partition 2 are likewise in the vicinity of the fixed partial unit on the driver's side, especially between two cover panels 26, 27. Both window panes 24 of the fixed partial unit and window pane 25 of the transversely movable partial unit are mounted to be movable vertically by means of a common drive device. For this purpose, a double cable lifter is provided that can raise or lower both window panes 24, 25 by appropriate double cable guides and return rollers, and can nevertheless be positioned between the fixed cover panels 27, 26 of the fixed partial unit. In addition, the entire movable partial unit including cover panels 28, 29 of the lower wall section and window pane 25 can be moved horizontally with respect to the fixed partial unit, with the movable partial unit being received inside the fixed partial unit. In addition, partition 2C according to FIG. 14 in the vicinity of the fixed partial unit, has a flap 31 through which a receptacle 30 can be moved rearward in the lengthwise direction of the vehicle. Window panes 24, 25 can be cut out in their corner areas in order not to prevent the movement of receptacle 30 in the lowered resting position as well.

All of the drives and guides of the wall sections and partial units of the partitions described above need not necessarily be designed in accordance with the embodiment described. The guides can also be provided in a different manner with sliding or rolling bearing units. In addition, the drive units, in addition to electrical functions, can also be designed pneumatically, hydraulically, or in some other fashion. All of the embodiments described are optionally capable of being combined with one another, especially as regards individual units or detail solutions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle including a partition assembly for dividing a vehicle interior into a front area having a driver side and another side, and into a rear area, said partition assembly comprising:

a fixed partition unit fixedly arranged behind an entire area of the driver side of the front area of the vehicle interior, the entire area of the driver side being defined by at least a width of a driver's seat viewed in a transverse direction of the motor vehicle, and at least one movable partition unit movable between a closed end position blocking the front area from the rear area and an open position opening a passageway between the front area and the rear area.

2. Motor vehicle according to claim 1, wherein the fixed partition unit and the movable partition unit abut one another along a plane extending in a transverse direction of the vehicle.

3. A partition assembly according to claim 1, wherein the fixed partial unit is provided with cover wall panels in such fashion that space is available between the wall panels for at least partial reception of the movable partial unit.

4. A partition assembly according to claim 1, wherein the at least one movable partition unit is mounted and guided to be linearly movable in the transverse direction of the vehicle.

5. Motor vehicle according to claim 1, wherein the motor vehicle is a passenger automobile.

6. Motor vehicle according to claim 1, wherein a closable opening is provided in the immovably fixed partition unit of the partition for a receptacle that is movable in a lengthwise direction of the vehicle.

7. Motor vehicle according to claim 1, wherein the partition has seals associated with it in a roof area, said seals guiding the partition and framing it in a sound-proof manner in a closed end position.

8. Motor vehicle according to claim 1, wherein a drive is provided that moves the movable partition unit horizontally.

9. Motor vehicle according to claim 8, wherein a flexible pulling and pushing device is associated with the drive and connected by a dimensionally stable deflecting guide with the partition unit to be moved.

10. Motor vehicle according to claim 1, wherein the at least one movable partition unit has a corresponding end section at a level of a motor vehicle tunnel, said section being designed as a separate part and being mounted to move between an open position and a closed position.

11. Motor vehicle according to claim 10, wherein the at least one movable partition unit is guided on guide rollers that serve as a guide on the end section.

12. Motor vehicle according to claim 11, wherein a drive is provided that moves the movable partition unit horizontally.

13. Motor vehicle according to claim 1, wherein at least one of the partition units is divided into at least one upper wall section and one lower wall section, said at least one upper wall section being mounted so that it can be lowered at least partially into the lower wall section.

14. Motor vehicle according to claim 13, wherein drives are provided in order to move the movable upper wall sections vertically and/or horizontally.

15. Motor vehicle according to claim 13, wherein a closable opening is provided in the immovably fixed partition unit of the partition for a receptacle that is movable in a lengthwise direction of the vehicle.

16. Motor vehicle according to claim 1, wherein the fixed partition unit is provided with cover wall panels in such fashion that space is available between the wall panels for at least partial reception of the movable partial unit.

17. Motor vehicle according to claim 16, wherein a closable opening is provided in the immovably fixed partition unit of the partition for a receptacle that is movable in a lengthwise direction of the vehicle.

18. Motor vehicle according to claim 1, wherein the at least one movable partition unit is mounted and guided to be linearly movable in the transverse direction of the vehicle.

19. Motor vehicle according to claim 18, wherein the fixed partition unit is provided with cover wall panel in such fashion that space is available between the wall panels for at least partial reception of the movable partition unit.

20. Motor vehicle according to claim 18, wherein the at least one movable partition unit is divided into at least one upper wall section and one lower wall section, said at least one upper wall section being mounted so that it can be lowered at least partially into the lower wall section.

21. Motor vehicle according to claim 18, wherein the at least one movable partition unit has a corresponding end section at a level of a motor vehicle tunnel, said section being designed as a separate part and being mounted to move between an open position and a closed position.

22. Motor vehicle with a vehicle interior comprising:
a partition that divides the vehicle interior into a front area that has a driver's side and another side and a rear area, the partition extending in a transverse direction of the vehicle over substantially an entire width and height of the vehicle interior;
wherein the partition is divided into at least two partial units that abut one another along a plane extending in the transverse direction of the vehicle, with one partial unit of the partition being fixed immovably entirely behind a driver's side of the front area, the driver's side being defined by at least a width of a driver's seat viewed in the transverse direction of the motor vehicle, and with at least one additional partial unit being movable between two end positions, with the end positions opening or closing a passageway area between the front area and the rear area.

* * * * *